US010118681B1

(12) United States Patent
Andrasko et al.

(10) Patent No.: US 10,118,681 B1
(45) Date of Patent: *Nov. 6, 2018

(54) SYSTEM AND METHOD FOR AUTOMATICALLY CONTROLLING TRIM POSITION OF A MARINE DRIVE UNIT

(71) Applicant: Brunswick Corporation, Lake Forest, IL (US)

(72) Inventors: Steven J. Andrasko, Oshkosh, WI (US); Andrew J. Przybyl, Berlin, WI (US)

(73) Assignee: BRUNSWICK CORPORATION, Mettawa, IL (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/874,848

(22) Filed: Oct. 5, 2015

Related U.S. Application Data

(60) Provisional application No. 62/183,392, filed on Jun. 23, 2015.

(51) Int. Cl.
| | |
|---|---|
| *B63H 20/10* | (2006.01) |
| *B63J 99/00* | (2009.01) |
| *G05D 3/12* | (2006.01) |

(52) U.S. Cl.
CPC ............ *B63H 20/10* (2013.01); *B63J 99/00* (2013.01); *G05D 3/12* (2013.01); *B63J 2099/006* (2013.01)

(58) Field of Classification Search
CPC .... B63H 20/08; B63H 20/10; B63J 2099/006; B63J 2099/008
See application file for complete search history.

(56) References Cited

U.S. PATENT DOCUMENTS

| | | | |
|---|---|---|---|
| 3,682,127 | A | 8/1972 | Waquet |
| 3,777,694 | A | 12/1973 | Best |

(Continued)

FOREIGN PATENT DOCUMENTS

| | | |
|---|---|---|
| EP | 2368791 | 1/2013 |
| WO | 2000068744 | 11/2000 |

OTHER PUBLICATIONS

Andrasko et al., "Systems and Methods for Providing Notification Regarding Trim Angle of a Marine Propulsion Device", Unpublished U.S. Appl. No. 14/573,200, filed Dec. 17, 2014.

(Continued)

*Primary Examiner* — Jelani A Smith
*Assistant Examiner* — Donald J Wallace
(74) *Attorney, Agent, or Firm* — Andrus Intellectual Property Law, LLP (57) ABSTRACT

A method for automatically controlling a trim position of a trimmable drive unit with respect to a transom of a marine vessel includes retrieving from a memory a stored level trim position of the drive unit, measuring an actual trim position of the drive unit, and determining with a controller whether an absolute difference between the level trim position and the actual trim position exceeds a given threshold. The method also includes determining whether at least one of a plurality of trim-to-level enable conditions indicative of an idle state of an engine powering the drive unit is true. In response to a determination that the absolute difference exceeds the given threshold and that at least one trim-to-level enable condition is true, the method includes sending a control signal with the controller to trim the drive unit to the level trim position. A system for carrying out the method is provided.

18 Claims, 7 Drawing Sheets

(56) References Cited

U.S. PATENT DOCUMENTS

| | | |
|---|---|---|
| 3,999,502 A | 12/1976 | Mayer |
| 4,050,359 A | 9/1977 | Mayer |
| 4,318,699 A | 3/1982 | Wenstadt et al. |
| 4,413,215 A | 11/1983 | Cavil et al. |
| 4,490,120 A | 12/1984 | Hundertmark |
| 4,565,528 A | 1/1986 | Nakase |
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,007,866 A | 4/1991 | Okita |
| 5,063,381 A | 11/1991 | Ito |
| 5,113,780 A | 5/1992 | Bennett et al. |
| 5,118,315 A | 6/1992 | Funami et al. |
| 5,142,473 A | 8/1992 | Davis |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,095,077 A | 8/2000 | DeAgro |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,458,003 B1 | 10/2002 | Krueger |
| 6,583,728 B1 | 6/2003 | Staerzl |
| 6,733,350 B2 | 5/2004 | Lida et al. |
| 6,745,715 B1 | 6/2004 | Shen et al. |
| 6,994,046 B2 | 2/2006 | Kaji et al. |
| 6,997,763 B2 | 2/2006 | Kaji |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,389,165 B2 | 6/2008 | Kaji |
| 7,416,456 B1 | 8/2008 | Gonring et al. |
| 7,462,082 B2 | 12/2008 | Kishibata et al. |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B1 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 | 7/2012 | Moore |
| 8,261,682 B1 | 9/2012 | Devito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,762,022 B1 | 6/2014 | Arbuckle et al. |
| 8,807,059 B1 | 8/2014 | Samples et al. |
| 8,840,439 B1 | 9/2014 | Wiatrowski et al. |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,278,740 B1 | 3/2016 | Andrasko et al. |
| 9,290,252 B1 | 3/2016 | Tuchscherer et al. |
| 9,381,989 B1 | 7/2016 | Poirier |
| 9,463,858 B1 * | 10/2016 | Remmers ............... B63H 20/10 |
| 9,517,825 B1 | 12/2016 | Anschuetz et al. |
| 9,598,160 B2 | 3/2017 | Andrasko et al. |
| 9,694,892 B1 | 7/2017 | Anschuetz et al. |
| 9,745,036 B2 | 8/2017 | Andrasko et al. |
| 9,751,605 B1 | 9/2017 | Anschuetz et al. |
| 9,764,810 B1 | 9/2017 | Andrasko et al. |
| 9,862,471 B1 | 1/2018 | Taylor et al. |
| 9,896,174 B1 | 2/2018 | Anschuetz |
| 10,059,415 B1 * | 8/2018 | Anschuetz ............. B63H 20/10 |
| 2002/0174818 A1 * | 11/2002 | von Wolske ............ B63B 21/66 |
| | | 114/244 |
| 2003/0013359 A1 | 1/2003 | Suganuma et al. |
| 2003/0077953 A1 | 4/2003 | Kaji |
| 2004/0014376 A1 * | 1/2004 | Noyes ....................... B63B 1/22 |
| | | 440/66 |
| 2004/0224577 A1 | 11/2004 | Kaji |
| 2005/0245147 A1 | 11/2005 | Takada |
| 2007/0089660 A1 | 4/2007 | Bradley et al. |
| 2007/0093149 A1 * | 4/2007 | Csoke ................... B63H 20/10 |
| | | 440/61 G |
| 2010/0114412 A1 | 5/2010 | Mizutani |
| 2011/0195816 A1 | 8/2011 | Martin et al. |
| 2011/0263167 A1 | 10/2011 | Chiecchi |
| 2011/0281477 A1 | 11/2011 | Inoue et al. |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1 | 10/2014 | Kuriyagawa et al. |
| 2016/0068247 A1 | 3/2016 | Morvillo |

OTHER PUBLICATIONS

Andrasko et al., "System and Method for Controlling Attitude of a Marine Vessel Having Trim Tabs", Unpublished U.S. Appl. No. 14/472,565, filed Aug. 29, 2014.
Andrasko et al., "Systems and Methods for Controlling Movement of Drive Units on a Marine Vessel", Unpublished U.S. Appl. No. 14/177,762, filed Feb. 11, 2014.
Mercury Marine, 90-8M0081623 JPO Owners Manual—Auto Trim Portion, Section 2—On the Water, May 2013, p. 21.
Mercury Marine, 90-8M0076286 JPO Service Manual—Auto Trim Portion, Theory of Operation, Jul. 2013, p. 2A-5.
Poirier, Brian, "System and Method for Positioning a Drive Unit on a Marine Vessel," Unpublished U.S. Appl. No. 14/177,767, filed Feb. 11, 2014.
Andrasko et al., "Systems and Methods for Automatically Controlling Attitude of a Marine Vessel with Trim Devices", Unpublished U.S. Appl. No. 14/873,803, filed Oct. 2, 2015.
Anschuetz et al., "System and Method for Trimming a Trimmable Marine Device With Respect to a Marine Vessel", Unpublished U.S. Appl. No. 15/003,326, filed Jan. 21, 2016.
Anschuetz et al., "System and Method for Trimming Trimmable Marine Devices With Respect to a Marine Vessel", Unpublished U.S. Appl. No. 15/003,335, filed Jan. 21, 2016.
O'Brien et al., "Systems and Methods for Setting Engine Speed Relative to Operator Demand", Unpublished U.S. Appl. No. 14/684,952, filed Apr. 13, 2015.

(56) References Cited

OTHER PUBLICATIONS

Dengel et al., "Trim Control Systems and Methods for Marine Vessels", Unpublished U.S. Appl. No. 13/770,591, filed Feb. 19, 2013.
Mercury Marine, 90-8M0076286 JPO Service Manual—Auto Trim Portion, Section 2—On the Water, May 2013, p. 21.

* cited by examiner

SYSTEM AND METHOD FOR AUTOMATICALLY CONTROLLING TRIM POSITION OF A MARINE DRIVE UNIT

CROSS-REFERENCE TO RELATED APPLICATION

The present application claims the benefit of U.S. Provisional Application Ser. No. 62/183,392, filed Jun. 23, 2015, which is hereby incorporated by reference herein.

FIELD

The present disclosure relates to systems and methods for automatically controlling trim positions of trimmable drive units on a marine vessel.

BACKGROUND

Each of the below U.S. Patents and Applications is hereby incorporated herein by reference.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 5,707,263 discloses a system for a trimmable marine stem drive that shifts the trimmable range on a conventional hydraulic trim system. The system includes an enlarged cylinder anchor pin hole in the drive shaft housing, an anchor pin smaller in size than the enlarged anchor pin hole located in the drive shaft housing, and a movable trim adjustment insert that is inserted into the enlarged anchor pin hole to secure the anchor pin in a fixed position within the enlarged hole. It is preferred that the enlarged anchor pin hole be a substantially horizontal elongated hole, and that the trim adjustment insert be placed rearward of the anchor pin to position the anchor pin in a forward position, or forward of the anchor pin to locate the anchor pin in a rearward position. The invention shifts the trimmable range of the drive, while maintaining vibration isolation characteristics available in conventional hydraulic trim systems.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820 discloses a method for controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

U.S. Pat. No. 8,622,777 discloses systems and methods for maneuvering a marine vessel to limit interference by the hull of the vessel with reverse thrust. A marine propulsion device provides at least a reverse thrust with respect to the marine vessel. The propulsion device is vertically pivotable into a trim position wherein the hull does not impede or interfere with the reverse thrust. A control circuit controls the propulsion device to move into the trim position when the reverse thrust of the propulsion device is requested.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for automatically controlling a trim position of a trimmable drive unit with respect to a transom of a marine vessel is provided. The method includes retrieving from a memory a stored level trim position of the drive unit, measuring an actual trim position of the drive unit, and determining with a controller whether an absolute difference between the level trim position and the actual trim position exceeds a given threshold. The method also includes determining whether at least one of a plurality of trim-to-level enable conditions indicative of an idle state of an engine powering the drive unit is true. In response to a determination that the absolute difference exceeds the given threshold and that at least one trim-to-level enable condition is true, the method includes sending a control signal with the controller to trim the drive unit to the level trim position.

In another example of the present disclosure, a system for controlling a trim position of a trimmable drive unit with respect to a transom of a marine vessel includes a controller, a processor, and a memory. The memory stores instructions that, when executed by the processor, configure the controller to retrieve from the memory a stored level trim position of the drive unit; receive an actual trim position of the drive unit; determine whether an absolute difference between the level trim position and the actual trim position exceeds a given threshold; and determine whether at least one of a plurality of trim-to-level enable conditions indicative of an idle state of an engine powering the drive unit is true. In response to a determination that the absolute difference exceeds the given threshold and that at least one trim-to-level enable condition is true, the controller sends a control signal to trim the drive unit to the level trim position.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for automatically controlling trim positions of trimmable drive units on a marine vessel by controlling one or more trim actuators that couple the trimmable drive units to the transom of the marine vessel. In one example, each trim actuator is a hydraulic piston-cylinder in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of such trim actuators can be used to rotate trimmable drive units, such outboard motors or the outboard portions of sterndrives, up and down with respect to a marine vessel to which they are coupled.

Those skilled in the art of marine vessel propulsion and control are familiar with many different ways in which the trim angle of a drive unit can be varied to change the handling or feel of the vessel. For example, many manual trim control systems are known to those skilled in the art. In typical operation, the operator of a marine vessel can change the trim angle of an associated drive unit as the velocity of the vessel changes. This is done to maintain an appropriate angle of the vessel with respect to the water as it accelerates, achieves a planing speed, and as it increases its velocity over the water while on plane. The operator inputs a command to change the trim angle for example by using a keypad, button, or similar input device with "trim up" and "trim down" input choices. The operator can select these input choices to trim the drive unit up or down until a desired handling or feel of the vessel over the water is achieved.

The systems of the present disclosure are also capable of carrying out automatic trim (auto-trim) methods, in which the drive unit is automatically trimmed up or down with respect to its current position, depending on a desired attitude of the marine vessel with respect to vessel speed. Auto-trim systems perform the trim operation automatically, as a function of vessel speed, without requiring intervention by the operator of the marine vessel. The automatic change in trim angle of the drive unit enhances the operation of the marine vessel as it accelerates, achieves planing speed, and further increases its velocity over the water while on plane.

Figure 1:
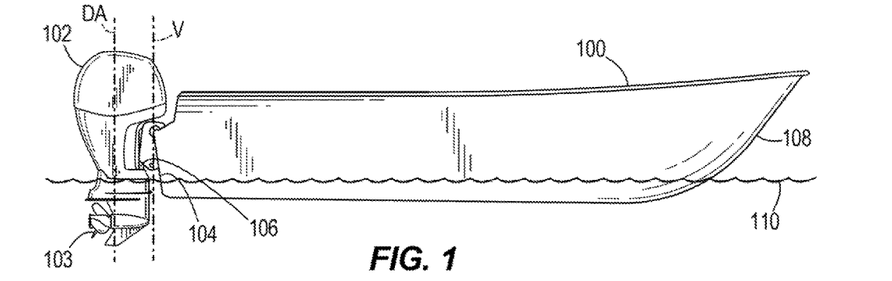
FIG. 1 illustrates a marine vessel having a trimmable drive unit.
Figure 2:
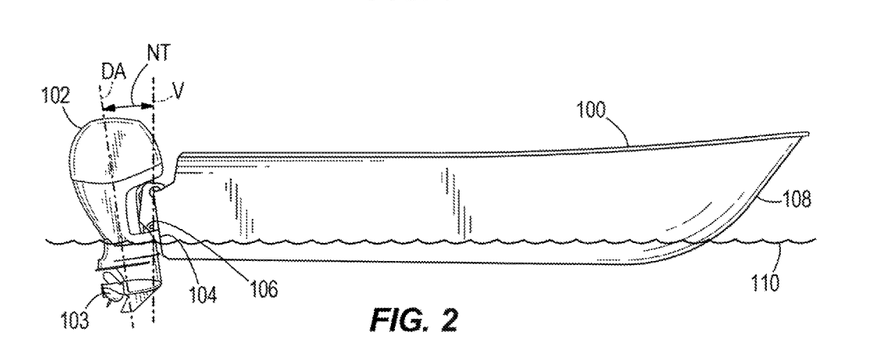
FIG. 2 illustrates the marine vessel of FIG. 1, with the drive unit in a trimmed in position.
Figure 3:
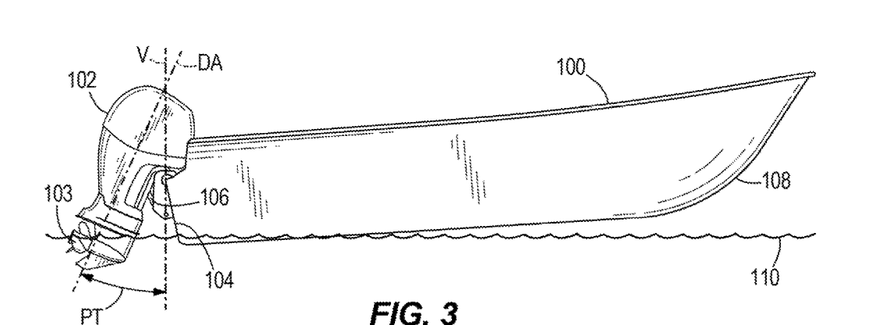
FIG. 3 illustrates the marine vessel of FIGS. 1 and 2, with the drive unit in a trimmed out position.

FIGS. 1-3 illustrate one example of a marine vessel 100 having a trimmable drive unit 102, such the outboard motor shown herein, coupled to the transom 104 of the marine vessel 100. In other examples, the drive unit 102 could be, for example, a sterndrive. The position of the drive unit 102 with respect to the transom 104 is controlled by a trim actuator 106 (see also FIG. 7). The drive unit 102 has an engine that, through a series of gears, turns a propeller 103 to produce a thrust to propel the marine vessel 100 in a generally forward direction. The drive unit 102 is capable of rotating around a generally vertical steering axis in response to commands from a steering wheel or autopilot system.

The trim actuator 106 can position the drive unit 102 at different angles with respect to the transom 104. In FIG. 1, the drive unit 102 is shown in one example of a level trim position, in which the drive unit 102 is in more or less of a vertical position. This can be seen by comparing driveshaft axis DA of the drive unit 102 with vertical line V, where the two lines are parallel. In FIG. 2, the drive unit 102 is shown in a trimmed in (trimmed down) position. In other words, the lines DA and V will intersect below where the drive unit 102 is connected to the transom 104. This may be referred to as a negative trim angle (NT) according to an exemplary convention. In FIG. 3, the drive unit 102 is shown in a trimmed out (trimmed up) position. The lines DA and V will intersect above the drive unit's connection point to the transom 104. This may be referred to as a positive trim angle (PT). The positions in FIGS. 1 and 2 are generally used when the marine vessel 100 is operating at slower speeds. For example, the trim position shown in FIG. 1 is often used when the marine vessel is in a joysticking mode or is docking. The trim position in FIG. 2 is often used during launch of the marine vessel 100, before the marine vessel 100 has gotten up to speed and on plane. This position maintains the bow 108 of the vessel 100 in the water 110. In contrast, the trim position shown in FIG. 3 is often used when the marine vessel is on plane and high speeds are required. At high speeds, the trim position shown in FIG. 3 causes the bow 108 of the marine vessel 100 to rise out of the water 110 as shown.

Figure 4:
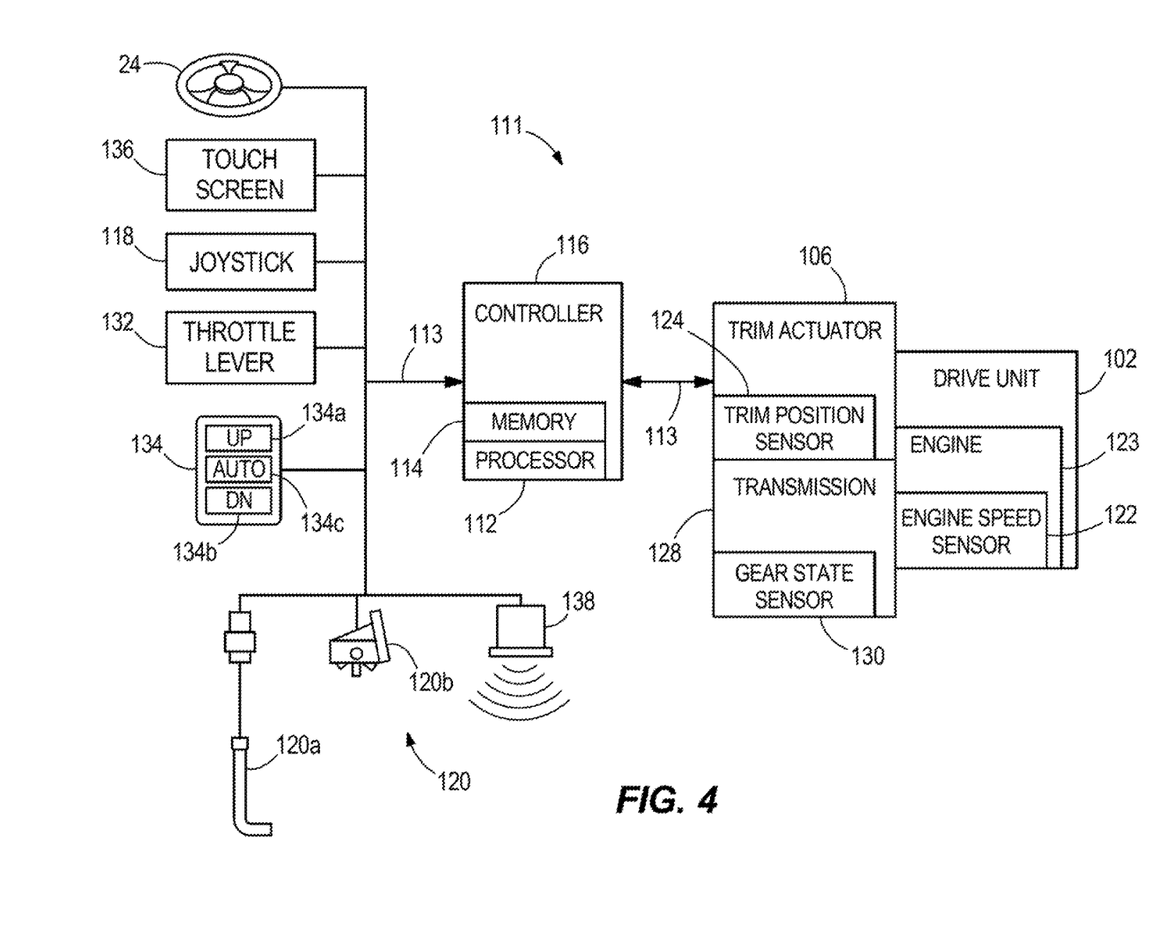
FIG. 4 illustrates system for controlling a trim position of the drive unit with respect to the marine vessel according to one example of the present disclosure.

FIG. 4 shows a schematic of a system 111 1 for controlling the trim position of the drive unit 102 associated with the marine vessel 100 of FIGS. 1-3. In the example shown, the system ill includes a controller 116 that is programmable and includes a processor 112 and a memory 114. The controller 116 can be located anywhere in the system 111 and/or located remote from the system 111 and can communicate with various components of the marine vessel 100 via wired and/or wireless links, as will be explained further herein below. Although FIG. 4 shows a single controller 116, the system 111 can include more than one controller 116. For example, the system 111 can have a controller 116 located at or near a helm of the marine vessel 100 and can also have one or more controllers located at or near the drive unit 102. Portions of the method can be carried out by a single controller or by several separate controllers. Each controller 116 can have one or more control sections or control units. One having ordinary skill in the art will recognize that the controller 116 can have many different forms and is not limited to the example that is shown and described. For example, here the controller 116 carries out the trim control method for the entire system 111, but in other examples separate trim control units and propulsion control units could be provided.

In some examples, the controller 116 may include a computing system that includes a processing system, storage system, software, and input/output (I/O) interfaces for communicating with devices such as those shown in FIG. 4, and about to be described herein. The processing system loads and executes software from the storage system, such as software programmed with a trim control method. When executed by the computing system, trim control software directs the processing system to operate as described herein below in further detail to execute the trim control method. The computing system may include one or many application modules and one or more processors, which may be communicatively connected. The processing system can comprise a microprocessor (e.g., processor 112) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 114) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 116 communicates with one or more components of the system 11 via a communication link 113, which can be a wired or wireless link. The controller 116 is capable of monitoring and controlling one or more operational characteristics of the system 111 and its various subsystems by sending and receiving control signals via the communication link 113. In one example, the communication link 113 is a controller area network (CAN) bus, but other types of links could be used. It should be noted that the extent of connections of the communication link 113 shown herein is for schematic purposes only, and the communication link 113 in fact provides communication between the controller 116 and each of the sensors, devices, and various subsystems described herein, although not every connection is shown in the drawing for purposes of clarity.

As mentioned, the controller 116 receives inputs from several different sensors and/or input devices aboard or coupled to the marine vessel. For example, the controller 116 receives a steering input from a joystick 118 and/or a steering wheel 24. The controller 116 is provided with an input from a vessel speed sensor 120. The vessel speed sensor 120 may be, for example, a pitot tube sensor 120a, a paddle wheel type sensor 120b, or any other speed sensor appropriate for sensing the actual speed of the marine vessel. The vessel speed may instead be obtained by taking readings from a GPS device, which calculates speed by determining how far the vessel has traveled in a given amount of time. The drive unit 102 is provided with an engine speed sensor 122, such as but not limited to a tachometer, that determines a speed of the engine 123 powering the drive unit 102 in rotations per minute (RPM). A trim position sensor 124 is also provided for sensing an actual position of the trim actuator 106, for example, by measuring a relative position between two parts associated with the trim actuator 106. The trim position sensor 124 may be any type of sensor known to those having ordinary skill in the art, for example a Hall effect sensor or a potentiometer. A transmission 128 and gear state sensor 130 (sensing forward, neutral, or reverse gear of the transmission) can also be provided for the drive unit 102. The gear state sensor 130 may be a potentiometer and electronic converter, such as an analog to digital converter that outputs a discrete analog to digital count that represents a position of a shift linkage associated with the transmission, or may be a potentiometer sensing a position of a throttle lever 132 as signifying a gear state of the transmission.

Other inputs can come from operator input devices such as the throttle lever 132, a keypad 134, and a touchscreen 136. The throttle lever 132 allows the operator of the marine vessel 100 to choose to operate the vessel in neutral, forward, or reverse, as is known. The keypad 134 can be used to initiate or exit any number of control or operation modes (such as auto-trim mode), or to make selections while operating within one of the selected modes. In one example, the operator input device such as the keypad 134 comprises an interface having at least a "trim up" input 134a, a "trim down" input 134b, and an "auto-trim on/resume" input 134c, shown herein as buttons. The controller 116 operates the system 111 in the manual mode in response to selection of one of the "trim up" 134a and "trim down" inputs 134b. For example, a trim up command will actuate the trim actuator 106 to trim the trim tab or drive unit up, while a trim down command will command the trim actuator 106 to trim the drive unit 102 down. On the other hand, the controller 116 may operate the system 111 in the automatic mode in response to selection of the "auto-trim on/resume" input 134c. The touchscreen 136 can also be used to initiate or exit any number of control or operation modes (such as trim up, trim down, or auto-trim mode), and in that case the inputs can be buttons in the traditional sense or selectable screen icons. The touchscreen 136 can also display information about the system 111 to the operator of the vessel, such as engine speed, vessel speed, trim angle, trim operating mode, propulsion system operating mode, etc. A water depth sensor 138 such as a sonar may also be provided.

Figure 5:
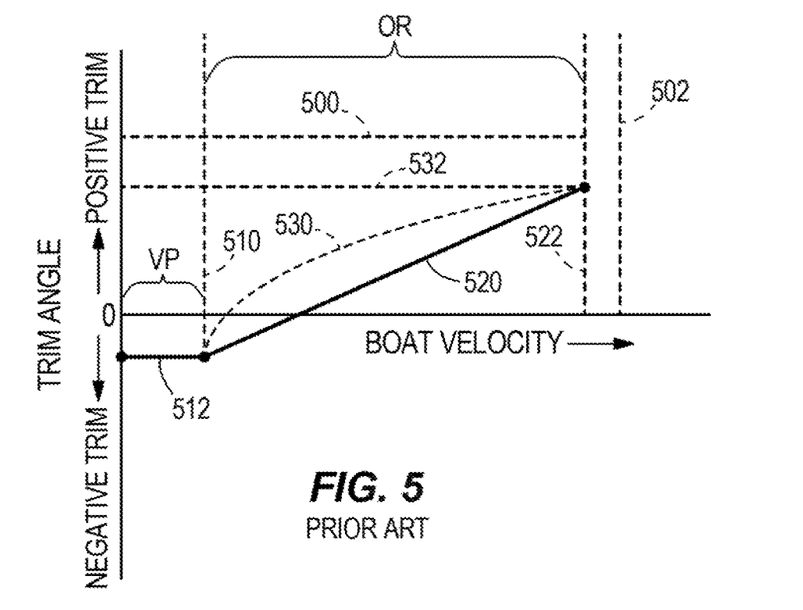
FIG. 5 is a graph showing an exemplary relationship between boat speed and an automatically-commanded trim angle according to a prior art algorithm.

As mentioned, the controller 116 may control the system 111 in an automatic mode, in which the controller 116 sends control signals to the trim actuator 106 automatically as a function of a speed of the vessel 100. For example, FIG. 5 is a graphical representation showing an exemplary prior art relationship between the trim angle of a drive unit 102 and the velocity of a marine vessel 100 according to an exemplary auto-trim method. It should be noted that the graph shown in FIG. 5 is meant to show position of a drive unit 102 such as an outboard motor or a sterndrive according to the positive and negative trim angle conventions described herein with respect to FIGS. 1-3. However, other conventions could be used in other examples.

Dashed line 500 represents a maximum positive trim angle PT of the drive unit 102 that will maintain the drive unit 102 in the water at a functional position. Dashed line 502 represents the maximum velocity of the marine vessel 100. Dashed line 510 represents the planing speed of the marine vessel 100. Line 512 represents the change in velocity of the marine vessel 100 from a stationary condition to the achievement of planing speed at dashed line 510. This increase in velocity is identified as VP in FIG. 5. In one example, the trim angle of the drive unit 102 is maintained at a negative magnitude of NT such as shown in FIG. 2. This negative trim angle is maintained until the marine vessel 100 reaches planing speed 510. Then, the trim angle is increased as a function of vessel speed as indicated by line 520 in FIG. 5. This continues until the marine vessel 100 achieves a velocity which is represented by dashed line 522. It can be seen that this velocity represented by dashed line 522 is less than the maximum velocity 502 of the marine vessel. The range of speeds between dashed lines 510 and 522 is identified as its operating range OR between first and second speed magnitudes during which the trim angle is changed, according to this example, as a function of the vessel speed. In FIG. 5, this rate of change is linear as represented by line 520. However, as represented by dashed line 530, this relationship need not be linear in all applications. Dashed line 532 represents the maximum trim that is achieved during automatic trim operation when the marine vessel achieves the second speed magnitude 522. In one example, this maximum trim is trim angle PT shown in FIG. 3.

Through research and development, the present inventors have discovered that when manually trimming, most operators leave their drive unit(s) fully trimmed down while maneuvering at low speeds. Many prior art auto-trim systems also leave the drive unit(s) fully trimmed down below planing speeds, as shown by line 512 in FIG. 5. One problem with this is that there is a loss of thrust efficiency, as the direction of thrust from the propeller(s) is oriented at an angle to horizontal. Another problem is that when at idle, most fully trimmed-down outboards or sterndrives transmit unwanted vibrations to the vessel and/or operator. However, the present inventors have determined that if an outboard is trimmed off of mechanical stops coupled to the transom via the lower end of an associated transom bracket, or if a sterndrive is trimmed such that its gearbox is level and its universal joints are aligned straight with respect to one another, then noise vibration and harshness (NVH) are reduced. It should be noted that the methods for increasing efficiency and reducing NVH about to be described could be implemented without fully implementing an auto-trim system, could be done using measurements of time and engine speed only, could be done only at idle, and could be programmed into any engine ECU without necessarily requiring an extra control module. Some of these variations will be discussed further.

Referring back to FIG. 4, in some embodiments, the system 111 for controlling a trim position of a trimmable drive unit 102 with respect to a transom 104 of a marine vessel 100 may include a controller 116; a processor 112; and/or a memory 114 storing instructions that, when executed by the processor 112, configure the controller to retrieve from the memory 114 a stored level trim position of the drive unit 102. In one example, regardless of whether the drive unit 102 is an outboard motor or a sterndrive, the level trim position is one in which a drive shaft of the drive unit 102 is substantially vertically oriented. In other words, the drive unit 102 may be trimmed to zero degrees with respect to vertical (see FIG. 1). In other examples, the level trim position is a pre-programmed position in which the drive unit 102 is out of contact with a mechanical stop coupled to the transom or a pre-programmed position in which a universal joint is aligned, as will be described now below.

Figure 7:
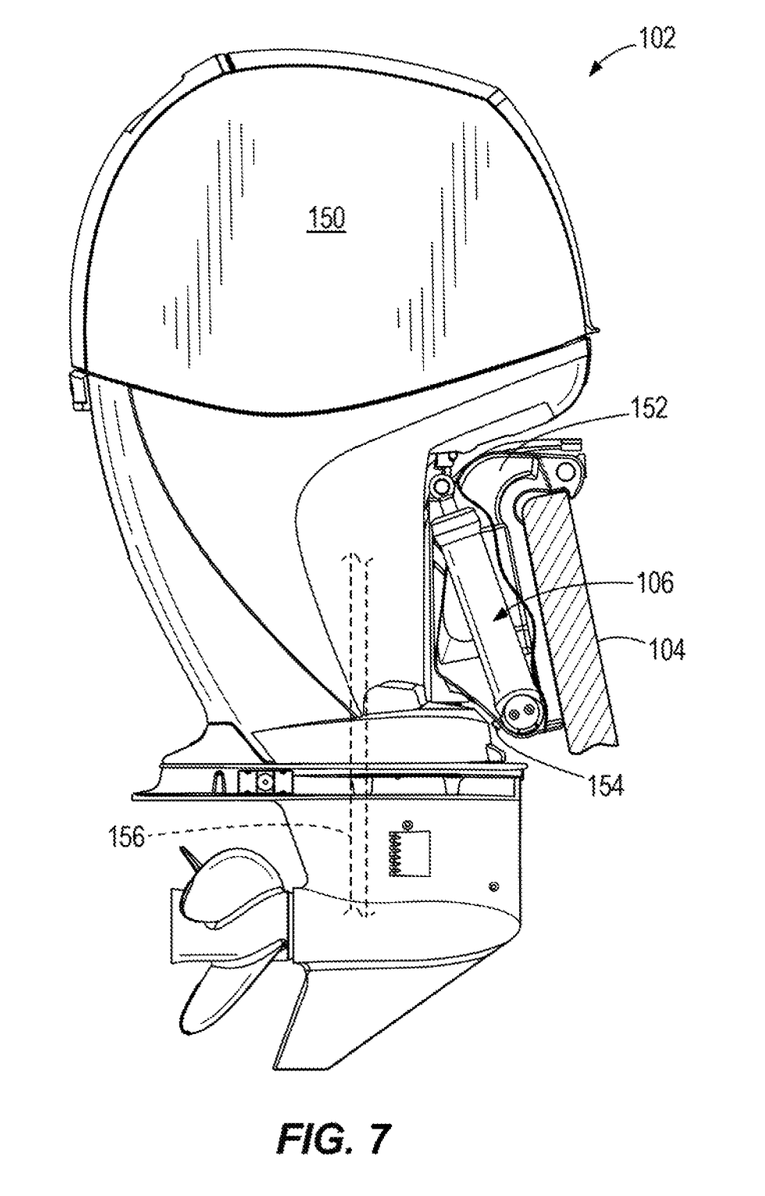
FIG. 7 illustrates a more detailed view of one example of a drive unit, in which the drive unit is an outboard motor that is in a level trim position.

One example of a level trim position of the drive unit 102 is shown in FIG. 7. In this example, the drive unit 102 is an outboard motor 150 coupled to the transom 104 of the marine vessel 100 via a transom bracket 152. A portion of the transom bracket 152 is shown cut away in order to show the relative location of the trim actuator 106, which is in signal communication with the controller 116 and coupled between the transom 104 and the drive unit 102. The trim actuator 106 is extendable and retractable to change the trim position of the drive unit 102 with respect to the transom 104. According to one example, the stored level trim position may be one that positions the outboard motor 150 out of contact with a mechanical stop 154 coupled to the transom 104, for example proximate a lower end of the transom bracket 152. For example, the mechanical stop 154 may be part of a clamp bracket, and a swivel bracket of the outboard motor 150 may touch the clamp bracket at the mechanical stop(s) when the outboard motor 150 is trimmed all the way down due to variations in the trim system's parts, production tolerances, etc. The level trim position would then be one in which the clamp bracket and swivel bracket were no longer touching. As mentioned above, in another example, the level trim position may be one in which the drive shaft 156 of the drive unit 102 is substantially vertically oriented, which may be a more trimmed-out position than merely trimming the outboard motor 150 out of contact with the mechanical stop 154.

Figure 8:
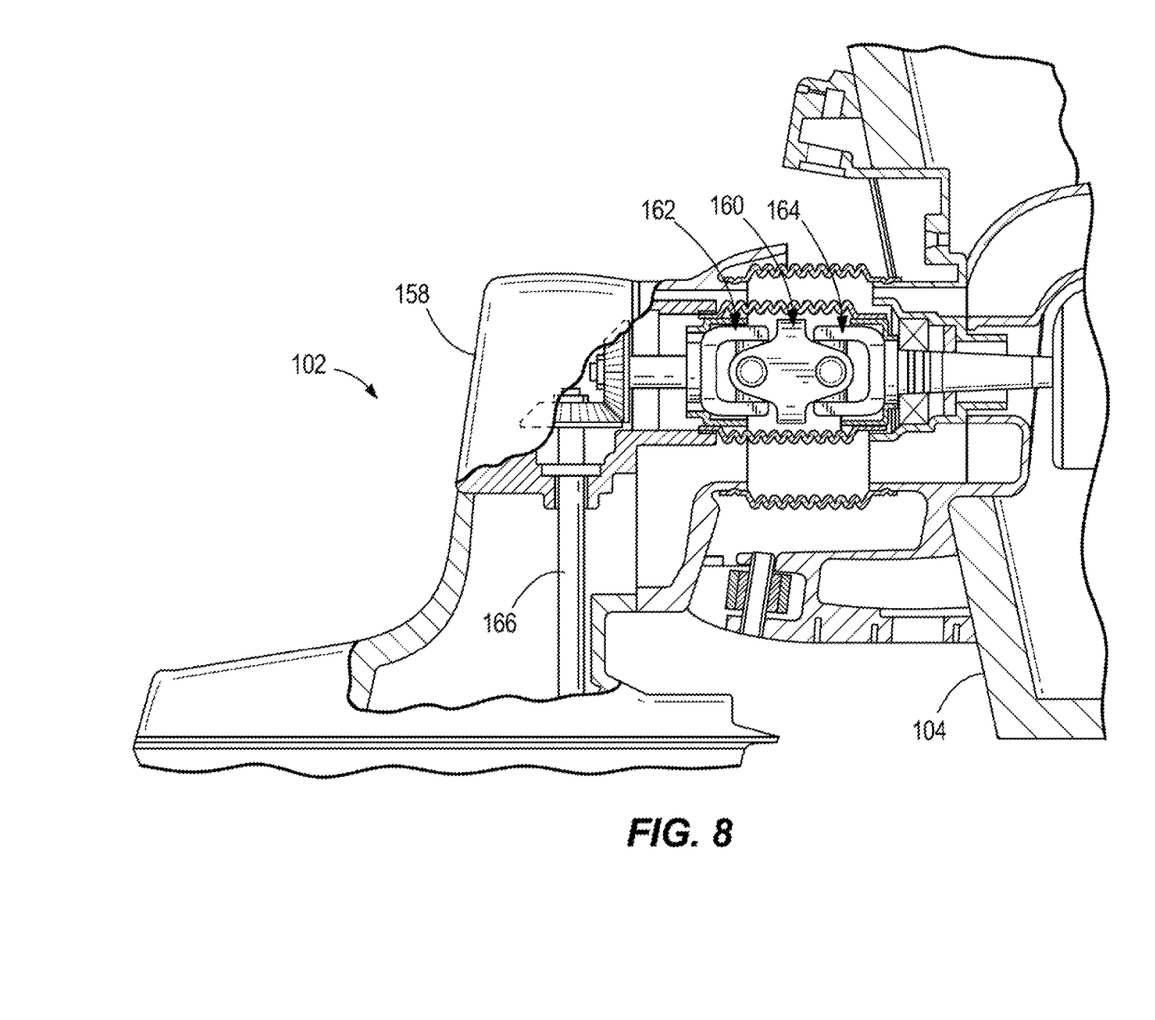
FIG. 8 illustrates a method according to one example of the present disclosure.

In another example, as shown in FIG. 8, the drive unit 102 is a sterndrive 158 coupled to the transom 104 of the marine vessel 100 via a universal joint 160. The level trim position may be one that orients a first part 162 of the universal joint 160 in line with respect to a second part 164 of the universal joint 160. As mentioned above, in another example, the level trim position may be one in which a drive shaft 166 of the drive unit 102 is substantially vertically oriented, which may be different than merely trimming the sterndrive 158 such that the parts 162, 164 of the universal joint 160 line up.

Figure 9:
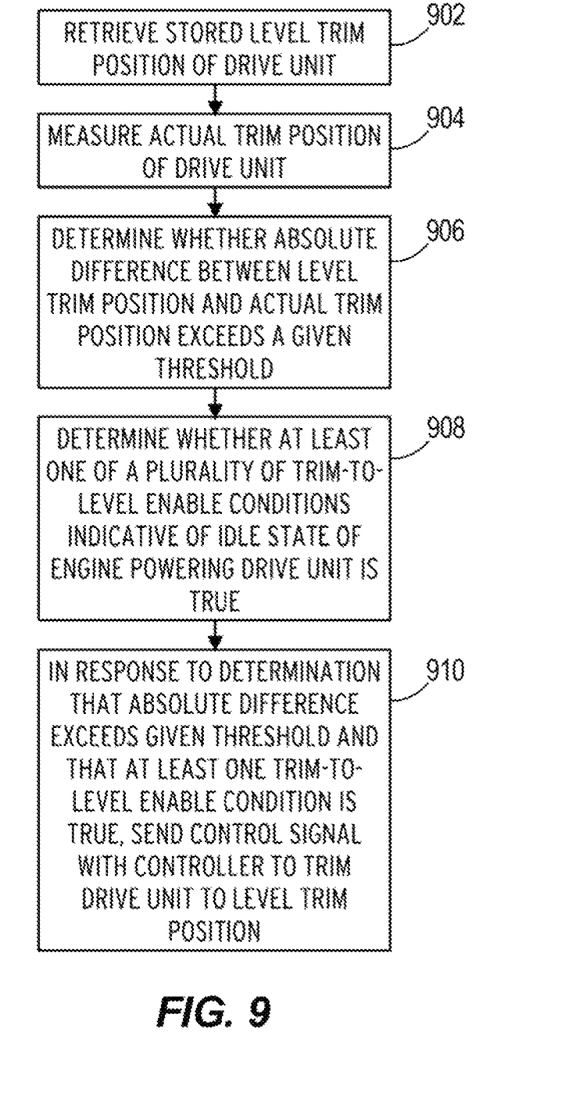
FIG. 9 illustrates a method according to another example of the present disclosure.

Now turning to FIG. 9, one example of a method for automatically controlling a trim position of a trimmable drive unit 102 with respect to a transom 104 of a marine vessel 100 is shown. At the outset, the method may require determining that the engine 123 of the drive unit 102 is running and/or in gear. The method may next include retrieving from a memory 114 a stored level trim position of the drive unit 102, as shown at block 902. Again, this level trim position may be one that orients the drive unit 102 as described herein above with respect to FIGS. 7 and 8. The method may further include measuring an actual trim position of the drive unit 102, as shown at block 904. This may be done using the trim position sensor 124 (FIG. 4). As shown at block 906, the method may include determining with a controller 116 whether an absolute difference between the level trim position and the actual trim position exceeds a given threshold. This threshold may represent the smallest discrete increment of change in trim position that the drive unit 102 is capable of achieving. This increment may be determined by the geometry of the drive unit 102 and/or trim actuator 106, the power of a hydraulic pump-motor combination associated with the trim actuator 106, the responsiveness of valves between the pump and a hydraulic cylinder portion of the actuator 106, etc. The increment may be calibrated into the memory 114 during setup. In another example, the given threshold is zero, and any difference between the actual and level trim positions will result in repositioning of the drive unit 102.

As shown at block 908, the method may include determining whether at least one of a plurality of trim-to-level enable conditions indicative of an idle state of an engine 123 powering the drive unit 102 is true. Again, the present inventors discovered that at or near idle, the engine 123 operates at low RPM, causing unwanted vibrations to be transferred to the vessel 100 and vessel operator. This is especially so if the drive unit 102 is trimmed down (see FIG. 2) in anticipation of vessel launch. The present inventors therefore realized it would be desirable to automatically trim the drive unit 102 to a position in which fewer unwanted vibrations are transferred to the vessel 100. Thus, at block 910, in response to a determination that the absolute difference exceeds the given threshold and that at least one trim-to-level enable condition is true, the method includes sending a control signal with the controller 116 to trim the drive unit 102 to the level trim position. In this position, as described with respect to FIG. 7, the drive unit 102 is up out of contact with mechanical stops near the lower end of the transom bracket 152 (when the drive unit is an outboard motor 150) and thus NVH is taken up by elastomeric mounts (not shown) coupling the outboard motor 150 to the transom 104 via the transom bracket 152. Referring to FIG. 8, when the drive unit 102 is a sterndrive 158, alignment of the two parts 162, 164 of the universal joint 160 also ensures that less NVH is transmitted to the vessel. As mentioned, the drive unit 102 (either an outboard motor 150 or a sterndrive 158) could be trimmed to a level trim position in which its drive shaft 156 or 166 is vertically oriented, which position may be the same as or different from the above-mentioned positions. In one example, the level trim position may be one in which the driveshaft axis DA of the drive unit 102 is oriented at zero degrees with respect to vertical V (see FIG. 1).

To determine whether the drive unit 102 is operating at or near idle, the controller 116 takes into account one or more of the above-mentioned trim-to-level enable conditions. In some embodiments, the trim-to-level enable conditions may include that a throttle controlling throttling of the engine 123 is in one of a neutral position, a reverse idle position, and a forward idle position; an actual speed of the engine 123 is less than a given engine speed threshold; an actual speed of the marine vessel 100 is less than a given first vessel speed threshold; and/or a gear state of a transmission 128 of the drive unit 102 is a neutral gear state. The throttle position can be determined with a potentiometer in the base of the throttle lever 132 or positioned near the blade of the throttle body, as known to those having ordinary skill in the art. The engine speed could be determined with engine speed sensor 122, the vessel speed could be determined with one of the vessel speed sensors 120, and the gear state could be determined with the gear state sensor 130. See FIG. 4. The engine speed threshold and first vessel speed threshold are pre-programmed or calibrated values representing idle or fast idle speeds. In still another example, to determine whether the drive unit 102 is operating at idle, the trim system communicates with an engine controller such as an ECU, which determines an "idle state" based on a compilation of many conditions, some of which are already listed above as the trim-to-level enable conditions.

To avoid unnecessary cycling of the system 111, it may be helpful to make sure there is some level of stasis at or near idle, and that the trim position of the drive unit 102 has remained constant for a while, before sending a control signal to trim the drive unit 102 to the level trim position. Therefore, in some embodiments, the method may further include requiring that a time for which (1) the absolute difference between the actual trim position and the level trim position exceeds the given threshold, and (2) one or more of the trim-to-level enable conditions is true, exceeds a given time threshold before sending the control signal to trim the drive unit 102 to the level trim position.

Further, in order to avoid trimming the drive unit 102 down in shallow water, where the operator may purposefully have trimmed it up to avoid obstacles, in some embodiments, the trim-to-level enable conditions may further include that the actual trim position of the drive unit 102 is less than a given trim position threshold and/or that a depth of water in which the marine vessel 100 is operating is greater than a given depth. Regarding the former condition, if the trim position is a very high value, for example one at which the propeller likely is not even fully in the water, it is reasonable to assume that the operator trimmed it to this position on purpose. Regarding the latter condition, the water depth can be determined by the depth sensor 138 (FIG. 4), and if it is very shallow, it can be assumed that the trim position is high on purpose as well. These two conditions could be used in conjunction with one another such that the trim-to-level algorithm is carried out only when both are true.

In some embodiments, the method may further include requiring that at least two trim-to-level enable conditions are true before sending the control signal to trim the drive unit 102 to the level trim position. This can help prevent accidental trimming to level when it is not necessarily helpful, e.g., when the system 111 is not actually operating at or near idle. For example, requiring that both the vessel speed and engine speed are less than given thresholds will allow the trim-to-level feature to remain inactive during trailering maneuvers, when the engine speed may otherwise transition from high to low even though the marine vessel 100 is not actually moving. Requiring both that the vessel speed is greater than a given threshold and the throttle lever is in a certain position may avoid auto-trimming to level when the system 111 is operating in a particular automatic control mode, such as autopilot, waypoint tracking, cruise control, etc. Requiring any of the other conditions in conjunction with requiring that the depth of the water is greater than a given depth can ensure that the actual trim position is not one the operator has purposefully commanded in order to avoid obstacles in shallow water. These are just a few non-limiting examples of how using one or more conditions in conjunction with one another can provide different safeguards for the system 111.

The present method can be carried out by a system that is programmed with full auto-trim capabilities, as described with respect to FIG. 5. Therefore, in some embodiments, the method may further include automatically actuating the drive unit 102 to a trimmed-in position with respect to the level trim position when the actual vessel speed exceeds the first vessel speed threshold, but is less than a given second vessel speed threshold. For example, the first vessel speed threshold may be a threshold between a speed associated with fast idling of the engine 123 and a speed at which the vessel will transition to plowing. For a visual explanation, refer to FIG. 6, which is identical to FIG. 5, except for at vessel speeds that are less than the planing speed 610. Line 606 represents vessel speeds at idle and fast idle. Here, the first vessel speed threshold is shown at dashed line 604, which represents a vessel speed at which the vessel transitions out of idling and begins plowing. Once this threshold at 604 is passed, the drive unit 102 is automatically trimmed down to a position that is optimal for launch because it minimizes bow rise. For example, it can be seen that at the first vessel speed threshold 604, the trim angle drops from zero degrees with respect to vertical to a negative trim angle, which may be equal to NT as shown in FIG. 2. Although the trim position is shown here as dropping from zero to a negative angle very quickly, this may in reality be a drop that occurs as vessel speed continues to increase due to the time required to actuate the trim system. Note that hysteresis could be applied around the threshold vessel speed at 604 in order to prevent trim cycling. In another example, the first threshold is based not on vessel speed, but on engine speed, and is about 1400 RPM. In yet another example, the first threshold is based on both engine speed and vessel speed, wherein both thresholds must be crossed in order for the drive unit 102 to be trimmed to the trimmed-in position.

Figure 6:
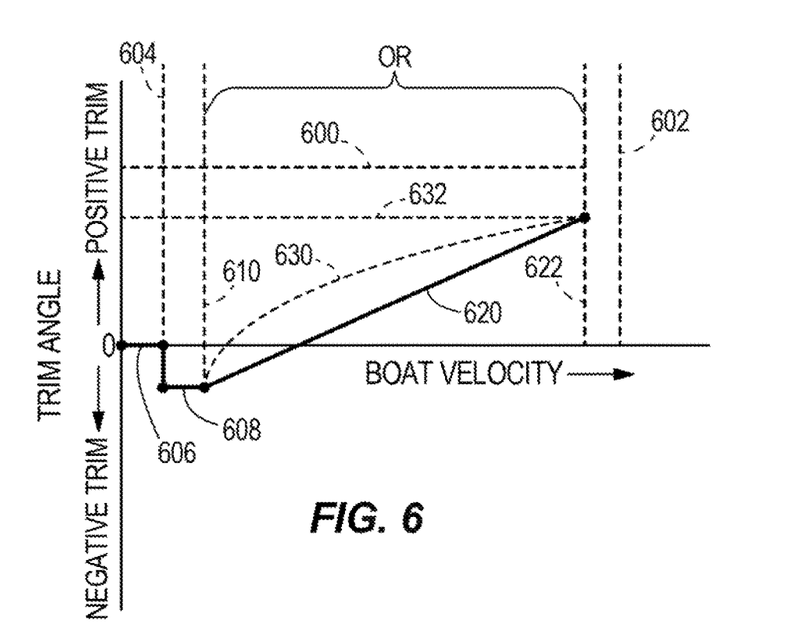
FIG. 6 is a graph showing an exemplary relationship between boat speed and an automatically-commanded trim angle according to the present disclosure.

Line 608 then represents vessel speeds at which the vessel is plowing. The trim angle remains negative here. The second vessel speed threshold, shown at 610, is a threshold at which the vessel 100 transitions out of plowing and increases speed to get on plane. In some embodiments, the method includes automatically actuating the drive unit 102 to a trimmed-out position with respect to the level trim position in response to the actual vessel speed reaching the second vessel speed threshold 610, and then automatically actuating the drive unit 102 to increasingly more trimmed-out positions with respect to the level trim position as the actual vessel speed continues to increase beyond the second vessel speed threshold 610. This transition could be sudden at first, as shown by line 630, or gradual, as shown by line 620. In another example, the second threshold is based not on vessel speed, but on engine speed, and is about 2500 RPM.

The method could alternatively be implemented by a system that is not programmed with a full auto-trim algorithm. For instance, instructions to carry out the method described herein could be executed by the main engine control unit of an engine 123, and could include trimming the drive unit 102 to level when the trim-to-level enable conditions are met and the absolute difference between the actual trim position and the level trim position exceeds the threshold. No automatic trimming after this need be provided with increase in vessel or engine speed. Rather, trimming can be commanded manually by the operator using the keypad 134 (FIG. 4).

Figure 10:
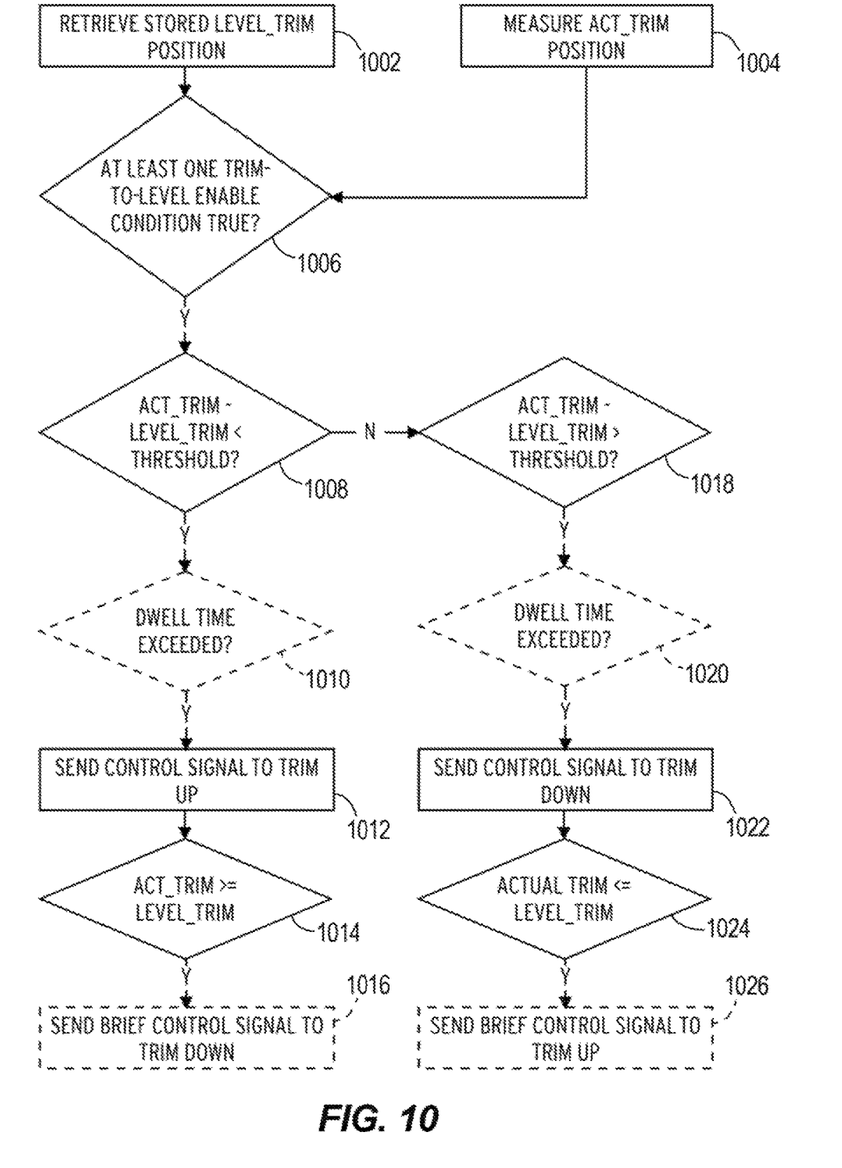
FIG. 10 illustrates a more detailed view of another example of a drive unit, in which the drive unit is a sterndrive that is in a level trim position.

Turning now to FIG. 10, another example of a method for trimming to level will be described. Similar to the method described herein above with respect to FIG. 9, the method shown in FIG. 10 includes retrieving a stored level trim position from a memory 114, as shown at block 1002, and measuring an actual trim position of the drive unit 102, as shown at block 1004. The method also includes determining if at least one of the above-mentioned trim-to-level enable conditions is true, as shown at block 1006. If NO, the method ends. If YES, at blocks 1008 and 1018, the method includes determining if an absolute difference between the actual trim position and the level trim position exceeds a given threshold. This can be done by first determining if ACT_TRIM−LEVEL_TRIM<THRESHOLD, as shown at block 1008. If YES, the method continues either to block 1010 or block 1012. Block 1010 is an optional block that determines if the time for which the absolute difference has exceeded the threshold and the trim-to-level enable conditions have been true exceed a given time threshold, here, the DWELL TIME. If YES, the method continues to 1012, and the controller 116 sends a control signal to trim the drive unit 102 up. When the system 111 determines that the actual trim is thereafter greater than or equal to the level trim (block 1014, YES), the system may then send a brief control signal to trim the drive unit 102 down as shown at optional block 1016, in order to minimize overshoot. For example, once a timer has hit a given amount of time on the order of tens of milliseconds, the trim down command will cease and the method will end. Such reverse signaling to the trim actuator 106 controlling the position of the drive unit 102 may be helpful in the event that the trim actuator 106 is a hydraulic actuator, and inertia in the trim system might otherwise cause overshooting of the level trim position.

Returning to block 1008, if the determination is NO, the method continues to block 1018, and includes determining whether ACT_TRIM−LEVEL_TRIM>THRESHOLD. If NO, the method ends because the actual trim position is as close to the level trim position as is possible or desired. If YES, the method continues to block 1020 to determine if the DWELL TIME is exceeded. Again, this step is optional and the method could instead proceed directly to block 1022 instead. The method then continues to blocks 1022, 1024, and 1026, which are similar to blocks 1012, 1014, and 1016, only the drive unit 102 is first trimmed down, and then a brief signal is sent to trim up the drive unit 102 to minimize overshoot. Details of the dwell time and reverse control signal braking algorithms are described in Applicant's co-pending U.S. application Ser. No. 14/874,740, filed on even date herewith, which is hereby incorporated by reference herein.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for automatically controlling a trim position of a trimmable drive unit with respect to a transom of a marine vessel, the method comprising:

retrieving from a memory a stored level trim position of the drive unit;

measuring an actual trim position of the drive unit;

determining with a controller whether an absolute difference between the level trim position and the actual trim position exceeds a given threshold;

determining whether at least two of a plurality of trim-to-level enable conditions indicate that an engine powering the drive unit is idling, wherein the at least two trim-to-level enable conditions include: (1) an actual speed of the engine is less than a given engine speed threshold, and (2) an actual speed of the marine vessel is less than a given first vessel speed threshold; and in response to a determination that the absolute difference exceeds the given threshold and that the at least two trim-to-level enable conditions indicate that the engine is idling, sending a control signal with the controller to trim the drive unit to the level trim position;

wherein the method is carried out automatically without requiring initiation by an operator of the marine vessel.

2. The method of claim 1, wherein the trim-to-level enable conditions further comprise:

a throttle controlling throttling of the engine is in one of a neutral position, a reverse idle position, and a forward idle position; and a gear state of a transmission of the drive unit is a neutral gear state.

3. The method of claim 2, further comprising requiring that a time for which the absolute difference exceeds the given threshold and the at least two trim-to-level enable conditions indicate that the engine is idling exceeds a given time threshold before sending the control signal to trim the drive unit to the level trim position.

4. The method of claim 2, wherein the trim-to-level enable conditions further comprise:

the actual trim position of the drive unit is less than a given trim position threshold; and a depth of water in which the marine vessel is operating is greater than a given depth.

5. The method of claim 2, further comprising automatically actuating the drive unit to a trimmed-in position with respect to the level trim position when the actual vessel speed exceeds the first vessel speed threshold, but is less than a given second vessel speed threshold.

6. The method of claim 5, further comprising:

automatically actuating the drive unit to a trimmed-out position with respect to the level trim position in response to the actual vessel speed reaching the second vessel speed threshold; and automatically actuating the drive unit to increasingly more trimmed-out positions with respect to the level trim position as the actual vessel speed continues to increase beyond the second vessel speed threshold.

7. The method of claim 2, further comprising determining whether the actual trim position has one of achieved and passed the level trim position, and if so, sending a brief control signal to reverse-actuate a trim actuator coupled between the drive unit and the transom.

8. The method of claim 1, wherein the drive unit is a sterndrive coupled to the transom of the marine vessel via a universal joint, and wherein the level trim position is one that orients a first part of the universal joint in line with respect to a second part of the universal joint.

9. The method of claim 1, wherein the drive unit is an outboard motor coupled to the transom of the marine vessel via a transom bracket, and wherein the level trim position is one that positions the outboard motor out of contact with a mechanical stop coupled to the transom.

10. The method of claim 1, wherein the level trim position is one in which a drive shaft of the drive unit is substantially vertically oriented.

11. A system for controlling a trim position of a trimmable drive unit with respect to a transom of a marine vessel, the system comprising:

a controller,
a processor; and
a memory storing instructions that, when executed by the processor, configure the controller to do the following automatically without requiring initiation by an operator of the marine vessel:

retrieve from the memory a stored level trim position of the drive unit;

receive an actual trim position of the drive unit;

determine whether an absolute difference between the level trim position and the actual trim position exceeds a given threshold;

determine whether at least two of a plurality of trim-to-level enable conditions indicate that an engine powering the drive unit is idling, wherein the at least two trim-to-level enable conditions include: (1) an actual speed of the engine is less than a given engine speed threshold, and (2) an actual speed of the marine vessel is less than a given vessel speed threshold; and in response to a determination that the absolute difference exceeds the given threshold and that the at least two trim-to-level enable conditions indicate that the engine is idling, send a control signal to trim the drive unit to the level trim position.

12. The system of claim 11, wherein the trim-to-level enable conditions further comprise:

a throttle controlling throttling of the engine is in one of a neutral position, a reverse idle position, and a forward idle position; and a gear state of a transmission of the drive unit is a neutral gear state.

13. The system of claim 12, wherein the instructions further configure the controller to require that a time for which the absolute difference exceeds the given threshold and the at least two trim-to-level enable conditions indicate that the engine is idling exceeds a given time threshold before sending the control signal to trim the drive unit to the level trim position.

14. The system of claim 12, wherein the trim-to-level enable conditions further comprise:

the actual trim position of the drive unit is less than a given trim position threshold; and a depth of water in which the marine vessel is operating is greater than a given depth.

15. The system of claim 11, further comprising a drive unit, wherein the drive unit is one of:

a sterndrive coupled to the transom of the marine vessel via a universal joint, wherein the level trim position is one that orients a first part of the universal joint in line with respect to a second part of the universal joint; and an outboard motor coupled to the transom of the marine vessel via a transom bracket, wherein the level trim position is one that positions the outboard motor out of contact with a mechanical stop coupled to the transom.

16. The system of claim 15, further comprising a trim actuator in signal communication with the controller and coupled between the transom and the drive unit, the trim actuator being extendable and retractable to change the trim position of the drive unit with respect to the transom.

17. The system of claim 15, further comprising a trim sensor sensing the actual trim position of the drive unit and in signal communication with the controller for providing the actual trim position to the controller.

18. The system of claim 15, wherein the level trim position is one in which a drive shaft of the drive unit is substantially vertically oriented.

* * * * *